(12) United States Patent
Shibata

(10) Patent No.: US 6,640,338 B1
(45) Date of Patent: Oct. 28, 2003

(54) ELECTRONIC DEVICE FOR CABLE BROADCASTING SYSTEM

(75) Inventor: Eiji Shibata, Nisshin (JP)

(73) Assignee: Masprodenkoh Kabushikikaisha, Nisshin (JP)

( * ) Notice: Subject to any disclaimer, the term of this patent is extended or adjusted under 35 U.S.C. 154(b) by 0 days.

(21) Appl. No.: 09/491,554

(22) Filed: Jan. 26, 2000

(30) Foreign Application Priority Data

Jan. 27, 1999 (JP) .......................................... 11-019008

(51) Int. Cl.$^7$ ................................................. H04B 1/18
(52) U.S. Cl. ..................... 725/149; 725/127; 725/105; 725/107; 725/119; 348/192
(58) Field of Search ................. 725/127, 149, 725/105, 107, 119; 348/192

(56) References Cited

U.S. PATENT DOCUMENTS 4,322,854 A * 3/1982 Bundens et al. ............ 725/108
5,604,528 A * 2/1997 Edwards et al. ............. 725/25
6,463,588 B1 * 10/2002 Jenkins et al. .............. 725/127

* cited by examiner

*Primary Examiner*—John Miller
*Assistant Examiner*—Johnny Ma
(74) *Attorney, Agent, or Firm*—Davis & Bujold, P.L.L.C.

(57) ABSTRACT

An electronic device for distributing broadcast signals in a cable broadcasting system includes a receiving circuit receiving broadcas signals including command signals and a microcomputer for controlling the electronic device according to the command signals. A watchdog timer counts an output s op period and compares with abnormality determining times. An output stop period is reset by a microcomputer pulse signal generated at constant intervals and representing normal operation of the microcomputer and an input stop period is reset by a periodic command pulse representing normal operation of the input from the receiving circuit to the microcomputer. The timer generates a microcomputer eset signal when a stop period exceeds an abnormality determining time.

4 Claims, 4 Drawing Sheets

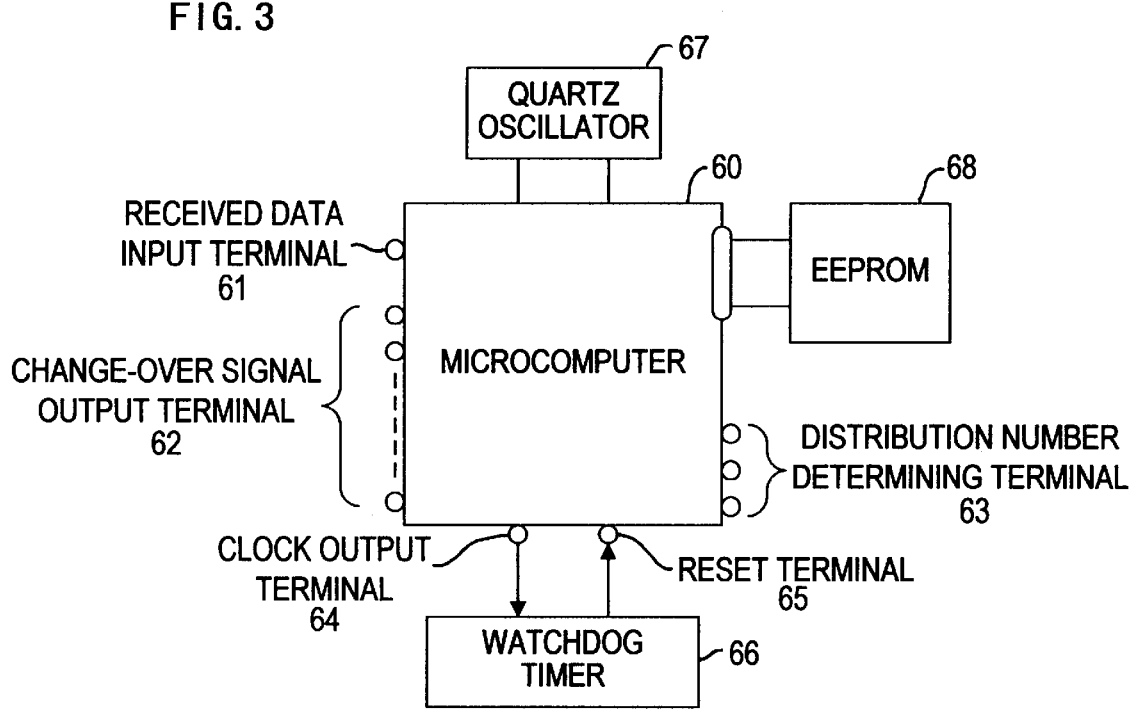

(MAIN ROUTINE)

ELECTRONIC DEVICE FOR CABLE BROADCASTING SYSTEM

FIELD OF THE INVENTION

The invention relates to an electronic device for a cable broadcasting system provided on a transmission line from a center equipment to a terminal device for processing broadcasting signals transmitted on the transmission line, and more specifically to an electronic device for a cable broadcasting system provided with a microcomputer as a control circuit.

BACKGROUND OF THE INVENTION

Heretofore, a tap device, an amplifier, a distributor and the like are known as electronic devices for a cable broadcasting system such as a CATV system provided on a transmission line made of a coaxial cable and the like from a center equipment to a terminal device, for processing broadcasting signals such as signals of television signals and the like. Some of such electronic devices are known to be designed to set the operation mode in response to command signals from the center equipment.

A tap device will be described as an example of an electronic device that can set the operation mode, as follows.

Such a tap device is provided with a directional coupler for branching a part of broadcasting signals passing through the transmission line and outputting the branched broadcasting signals from tap output terminals to terminal devices, a latching relay (simply called a "relay", hereinafter) provided in a signal pass transmitting the branched broadcasting signals to the tap output terminal for changing over the condition of on or off of the signal pass, an operation circuit for changing over the condition of on or off of the signal pass by operating the relay, a receiving circuit for receiving command signals from the center equipment, a control circuit comprising a microcomputer for setting the operation mode (in the case, the condition of on or off of the relay) and a power source circuit for receiving power signals from a power supply device via the transmission line and supplying the receiving circuit, control circuit and operation circuit with electricity.

When such a tap device is provided on a transmission line, a individual address is given to the tap device in order to discriminate it from other electronic devices on the transmission line. When the center equipment changes over the output of the broadcasting signals from the tap output terminal of the tap device, it produces a command signal made by giving an address characteristic to the tap device to a command data (simply called a "command", hereinafter) indicating content of a command, and transmits the command signal to the transmission line after converting it to a transmission signal. Then, in the tap device, the receiving circuit receives only the transmission signal, reconverts the signal to a command signal and outputs it to the control circuit. After receiving the command signal, the control circuit extracts the command signal from the center equipment by selecting a command signal with the same address among various comand signals, and outputs or stops broadcasting signals from the tap output terminal by operating the relay in response to the command contained in the command signal.

Such an electronic device capable of setting the operation mode in response to a command from the center equipment is provided with a control circuit including a microcomputer, in order to set operation mode in response to a command signal from the center equipment.

In such an electronic device, whose control circuit comprised a microcomputer, command signals from the center equipment occasionally could not be received because of misoperation of the microcomputer due to noises induced by, for example, a thunderbolt. In the case, since command signals could not be outputted to the microcomputer, the microcomputer had to be reset to be operated from the initial state. Heretofore, the operator had to be specially dispatched to the site of the tap device to push the resetting switch provided in the electronic device, in order to reset the microcomputer. It was very troublesome to do such works. That is, hitherto, the works for recovering normal state of the microcomputer had to be done manually.

Especially when the electronic device was a tap device, there happened problems such that broadcasting signals could not be transmitted for long time to the subscriber's terminal where the broadcasting signals should have been outputted from the tap output terminal of the tap device, that there came a telephone call of complaint from the subscriber that the television did not work or that there happened a loss of transmitting broadcasting signals to a subscriber's terminal where the broadcasting signals should not have been transmitted without fees for long time until the system w-as recovered, because it took long time until the operator was dispatched after the trouble was discovered by the center equipment.

SUMMARY OF THE INVENTION

An object of the invention is to provide an electronic device which can be automatically recovered to its initial state by resetting its microcomputer when it becomes impossible for the electronic device to receive command signals because of misoperation of the microcomputer due to a thunderbolt and the like, in a cable broadcasting system in which operation mode of the electronic device provided on a transmission line is designed to be set by the center equipment by transmitting a command signal from the center equipment to the transmission line.

In an electronic device of the invention, a microcomputer counts an input stop period of a command signal from a receiving circuit and stops output of a pulse signal to a watchdog timer when the input stop period gets to a predetermined time longer than a time interval at which a center equipment outputs command signals periodically.

On the other hand, the watchdog timer counts an output stop period of a pulse signal for monitoring operation condition outputted periodically from the microcomputer. When the counted output stop period gets to a predetermined abnormality determining time, the watchdog timer outputs a reset signal to the microcomputer to restart it from the initial state.

Therefore, according to the invention, even when the microcomputer becomes unable to receive command signals owing to noises inputted to the control circuit by, for example, a thunderbolt, command signals can be inputted to the microcomputer and the electronic device can automatically regain its normal function, by restarting the microcomputer and setting its initial state.

Then, in an electronic device of another aspect of the invention, the microcomputer counts an input stop period of the command signals to the electronic device itself as an input stop period of the command signals from the receiving circuit. When the counted input stop period gets to the predetermined time, output of a pulse signal to the watch dog timer is stopped. Specifically, operation signals for the electronic device itself as well as for other devices are inputted to the receiving circuit as far as the signals are command signals from the center equipment. In addition, the electronic device of the invention extracts only the signals for the device itself, counts the input stop period and determines whether the pulse signal should be outputted or stopped by comparing the period with a predetermined time interval at which signals are outputted periodically from the center equipment.

Therefore, according to the invention, when broadcasting signals are not transmitted to the subscriber's television set due to various troubles like thunderbolt, a reset signal is outputted to the microcomputer and it is restarted from the initial state, as mentioned above.

According to an electronic device of a further aspect of the invention, the microcomputer changes the predetermined time in response to a change command when a command signal received by the receiving circuit is a command for changing the predetermined time for the electronic device itself.

Therefore, according to the invention, the electronic device selects only the command signals to the device itself among all command signals received by the receiving circuit and can change the predetermined time in response to the change command when the command signal is the command for changing the predetermined time.

Hence, according to the invention, the electronic device can be easily applied to a cable broadcasting system in which transmission intervals of command signals from the center equipment differ for each of the command signals, thereby electronic devices with a wide use being provided.

In the furthest aspect of the invention, any of the electronic devices of the invention described above is applied to the tap device as an electronic device which sets operation mode in response to a command signal from the center equipment.

The tap device is provided with a directional coupler for branching a part of broadcasting signals and outputting the branched broadcasting signals from the tap output terminal. In the signal pass from the directional coupler to the tap output terminal, a change-over device such as a relay and the like for changing over the condition of on or off of the signal pass is provided. The tap device is also provided with an operation circuit for changing over the condition of on or off of the signal pass by operating the change-over device. The control circuit sets the condition of on or off of the signal pass in response to a command signal from the receiving circuit. The operation circuit changes over the condition of on or off of the signal pass by supplying the change-over device with electricity under the control of the control circuit. A power source circuit receives power signals from the power supply device via the transmission line and supplies the receiving circuit, control circuit and operation circuit with electricity.

Therefore, according to the tap device of the furthest aspect of the invention, when a command signal received by the receiving circuit is a command for the tap device itself for changing over the signal pass, the microcomputer operates the relay via the operation circuit in response to the command and changes over the condition of on or off of the signal pass by outputting a command for changing over the signal pass as a command signal from the center equipment.

BRIEF DESCRIPTION OF THE DRAWING FIGURES

The invention will now be described, by way of example, with reference to the accompanying drawings, in which:

FIG. 3 is a system block diagram showing an inner structure of a control circuit;

DETAILED DESCRIPTION OF THE PREFERRED EMBODIMENT

Figure 1:
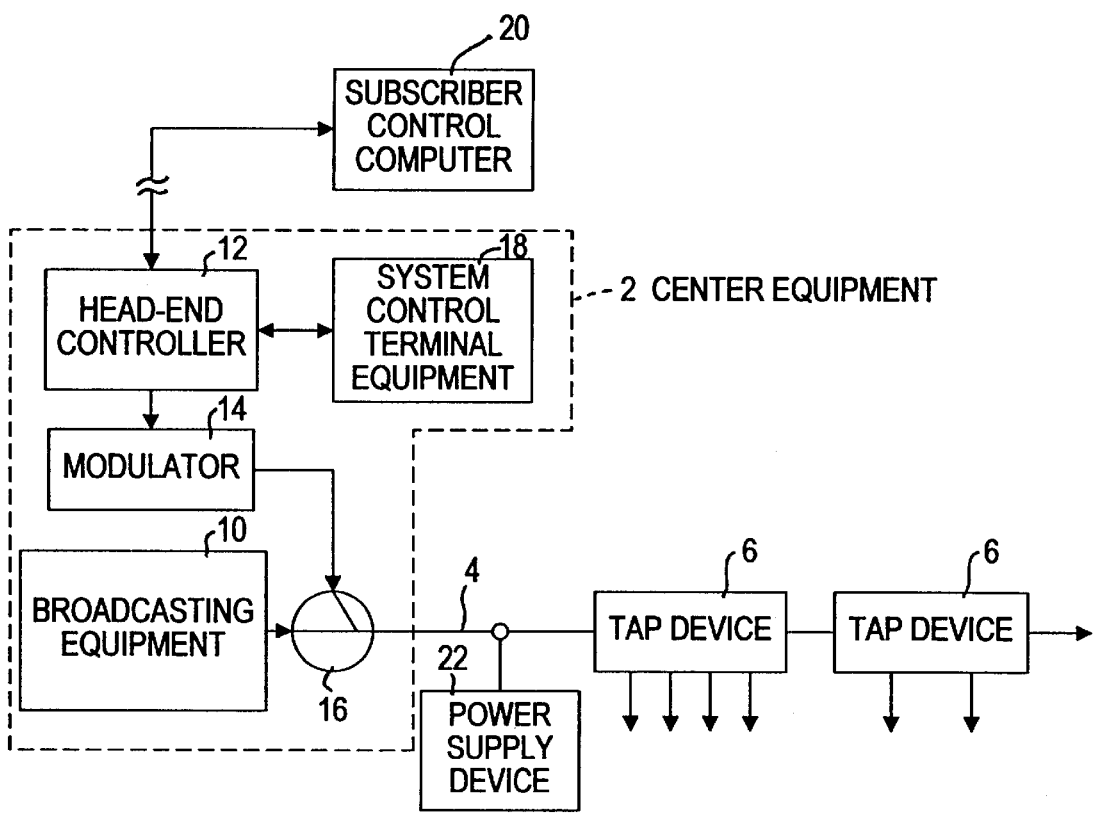
FIG. 1 is a schematic block diagram showing a CATV system of the embodiment.

As shown in FIG. 1, the CATV system of the embodiment transmits broadcasting signals of a predetermined frequency band (for example, 50 MHz–770 MHz) from a center equipment 2 to terminals via a transmission line 4. The broadcasting signals are transmitted to the subscribers terminals of the system via many tap devices 6 provided on the transmission line 4.

For this purpose, the center equipment 2 is provided with a broadcasting equipment 10 which produces various television signals for broadcasting in the system using an antenna for receiving television broadcasting signals transmitted from the artificial satellites and terrestrial stations, video devices for reproducing television signals recorded on video tapes and video disks and television cameras for its own broadcasting. The broadcasting equipment 10 converts each of the television signals to a broadcasting signal corresponding to a predetermined channel and transmits the converted signals to the transmission line 4.

The center equipment 2 is also provided with a head-end controller 12 for producing transmission data including an address having been allotted in advance to each electronic device;and a command indicating content of the command, a modulator 14 for converting the transmission data from the head-end controller 12 to a transmission command signal of a predetermined frequency band (for example, 70 MHz) by, for example, FSK modulation and a mixer 16 for mixing the command signal outputted by the modulator 14 with the broadcasting signal outputted by the broadcasting equipment 10, in order to transmit a command signal for controlling operation condition of each electronic device such as the tap device 6 and the like on the transmission line 4.

The head-end controller 12 outputs command signals for controlling operation conditions of electronic devices in the CATV system after producing transmission data in response to a command from a system control terminal equipment (computer) 18 or from a subscriber control computer 20 connected via a telephone line and the like. It includes a computer having communication function.

On the other hand, on the transmission line 4, a power supply device 22 for supplying an electronic device such as the tap device 6, an amplifier (not shown) and the like with electricity is provided. The power supply device 22 works by being supplied with electricity from a commercial power source. It supplies the transmission line 4 with power signals of alternate current of, for example, frequency of 60 Hz and voltage of 45V–90V. The power supply devices 22 are provided on the transmission line 4 dispersedly at a ratio of one power supply device 22 per several electronic devices to be supplied with electricity, considering electricity consumption of the electronic devices and the like.

The tap device 6 is the so-called tap-off for transmitting broadcasting signals to subscribers' terminals around the CATV system. It is provided on any of transmission lines 4 in the CATV system including a trunk directly connected with the center equipment 2, branch lines branched from the trunk via trunk bridgers, directional couplers and the like, sub-branch lines branched from the branch line, and the like. It is provided with one or more tap output terminals. In FIG. 1, a CATV system provided with tap devices 6 with two and four tap output terminals, respectively, is shown.

Figure 2:
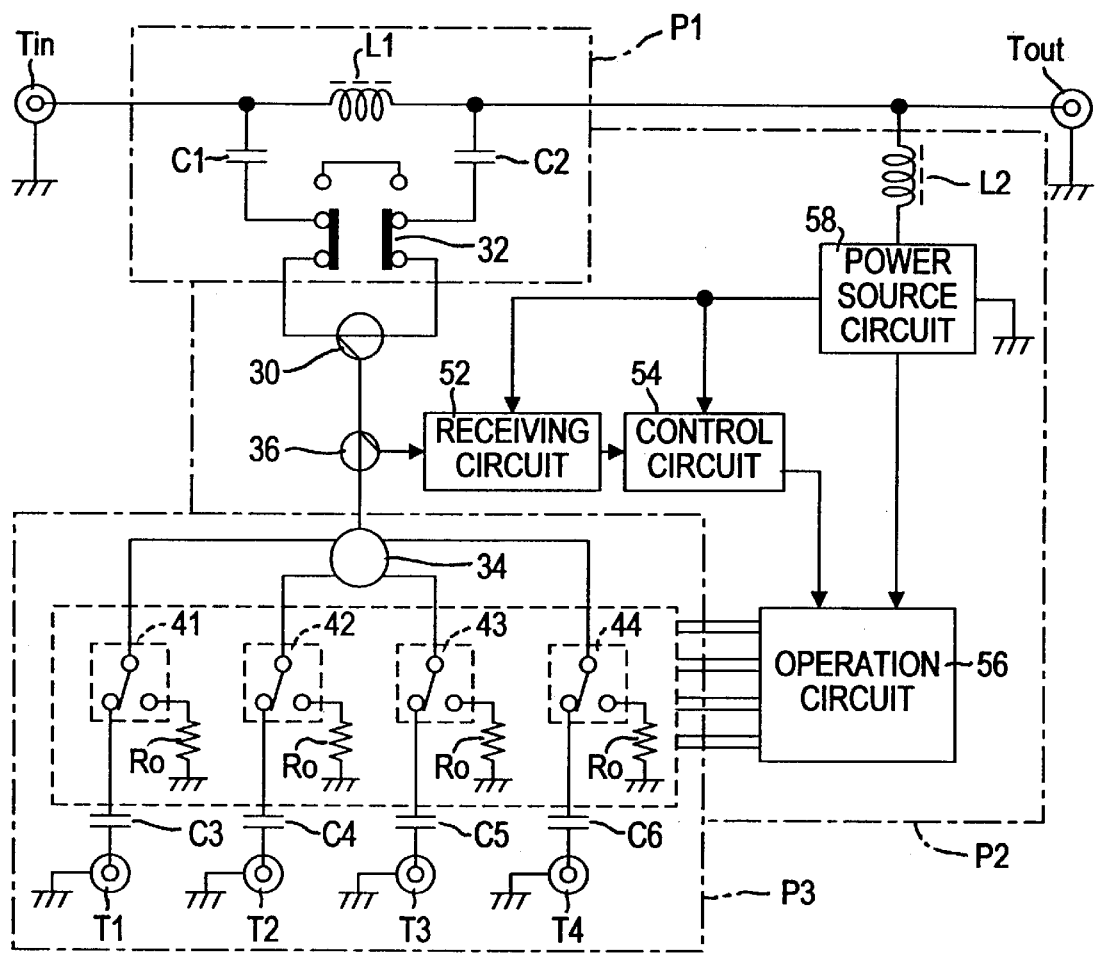
FIG. 2 is an electric circuit diagram showing a constitution of a tap device.

As shown in FIG. 2, the tap device 6 is provided with an input terminal Tin connected to the side of the center equipment 2 of the transmission line 4, an output terminal Tout connected to the terminal side of the transmission line 4 and plural tap output terminals T1, T2, T3, T4 (four terminals in FIG. 2). Between the input terminal Tin and the output terminal Tout, there is provided a choke coil L1 that passes power signals of low frequency alternate current supplied to the transmission line 4 by the power supply device 22 and shuts broadcasting signals and command signals (hereinafter, called "high frequency transmission signals", altogether.) transmitted from the center equipment 2 to the transmission line 4. With both ends of the choke coil L1 (that is, input/output terminals, Tin and Tout), each end of capacitors C1, C2 which shut power signals of low frequency alternate current and pass high frequency transmission signals is connected, respectively. The other end of each of the capacitors C1, C2 is connected with a change-over switch 32 which changes over from direct connection of them to connection of them via a directional coupler 30, or vice versa.

The directional coupler 30 outputs the high frequency transmission signals inputted from the input terminal Tin to the output terminal Tout and branches a part of the high frequency transmission signals to the tap output terminals T1 to T4.

The choke coil L1, capacitors C1, C2 and change-over switch 32 as well as connecting plugs constituting the input terminal Tin and output terminal Tout for connecting with the transmission line (coaxial cable) are provided on a first substrate P1 which is directly secured in a housing of the tap device 6. The directional coupler 30 is provided on a second substrate P2 detachably secured to the first substrate P1 together with a power source circuit mentioned hereinafter. Therefore, when, for example, the change-over switch 32 is changed over to the opposite side of the directional coupler 30 to electrically cut the second substrate P2 from the first substrate P1, the tap device 6 functions only as a bypass circuit for passing power signals of alternate current and high frequency transmission signals through the choke coil L1 and the capacitors C1, C2, without any influence to transmission signals passing through the transmission line 4.

Next, the high frequency transmission signals branched by the directional coupler 30 are inputted to a splitter 34 for splitting to four parts in the embodiment and distributed into a distribution number corresponding to the number of the tap output terminals T1–T4 by the splitter 34. The distributed high frequency transmission signals are transmitted to each of the tap output terminals T1–T4 via capacitors C3, C4, C5, C6 and outputted from the tap output terminals T1–T4 to the subscribers' terminal devices connected therewith.

In the signal passes from the splitter 34 to the tap output terminals T1–T4, there are provided latching relays 41, 42, 43, 44 (simply called a relay, hereinafter) for turning off or on the signal passes, terminal resistances Ro for impedance matching being connected therewith, respectively. Furthermore, in the signal passes of the high frequency transmission signal's from the directional coupler 30 to the splitter 34, there is provided a second directional coupler 36 for branching a part of high frequency transmission signals passing through the passes. The branched high frequency transmission signals branched by the directional coupler 36 are inputted into a receiving circuit 52.

The receiving circuit 52 selectively receives command signals among the high frequency transmission signals inputted from the directional coupler 36 and demodulates transmission data outputted by the head-end controller 12. The demodulated data (received data) are inputted into a control circuit 54.

The control circuit 54 is mainly composed of a one-chipped microcomputer comprising CPUs, ROMs, RAMs and the like. When a received data is inputted from the receiving circuit 52, the control circuit 54 operates the relays 41–44 via an operation circuit 56 based on the received data to carry out the processing for outputting or stopping high frequency transmission signals from the tap output terminals T1–T4.

A power source circuit 58 connected with the output terminal Tout via the choke coil L2 is also provided in the tap device 6. The choke coil L2 takes in a part of power signals of alternate current flowing through the transmission line 4 into the side of the power source circuit 58 and prevents high frequency transmission signals from flowing to the side of the power source circuit 58. The power source circuit 58 generates a power source voltage V1 (for example, direct current of 24V) for turning on or off the relays 41–44 and a power source. voltage V2 (for example, direct current of 5V) for operating the receiving circuit 52 and the control circuit 54 in a constant voltage, using the power signal of alternate current inputted via the choke coil L2.

Specifically, the power source circuit 58 commutates and smoothes the power signal of alternate current inputted via the choke coil L2 and generates the above-mentioned two power source voltages V1, V2 from the commutated and smoothed power signal of alternate current using a three-terminal regulator and the like. It also supplies the operation circuit 56 with the power source voltage V1 for switching the relays as well as the receiving circuit 52 and control circuit 54 with the power source voltage V2 for operation.

The splitter 34, relays 41–44, capacitors C3–C6 and tap output terminals T1–T4 are mounted on a third substrate P3 integrally secured to the second substrate P2 provided with the directional coupler 30, by means of screws and the like. The second directional coupler 36, reciving circuit 52, control circuit 54, operation circuit 56 and power source circuit 58 are provided on the second substrate P2 together with the above-mentioned directional coupler 30.

As shown in FIG. 3, the control circuit 54 is mainly composed of a microcomputer 60, with a watchdog timer 66 mentioned hereinafter, a quartz oscillator 67 and a EEPROM 68 in its periphery. The microcomputer 60 is provided with a received data input terminal 61 for inputting command signals from the receiving circuit 52, change-over signal output terminals 62 for outputting signals for changing over the relays via the operation circuit 56, a clock output terminal 64 for outputting monitoring clocks to the watch-dog timer 66, a reset terminal 65 for inputting reset signals for resetting and restarting the microcomputer 60 from the initial state from the watchdog timer 66 and distribution number setting terminals 63 for inputting and setting the distribution number from the outside when the substrate with the splitter 34 is exchanged.

The quartz oscillator 67 is a device for generating operation clocks with high stability of frequency and supplying them to the microcomputer 60. The supplied operation clocks are used by the microcomputer 60 for carrying out various processing operations. When command signals from the center equipment 2 are inputted to the received data input terminal 61 via the receiving circuit 52, the microcomputer 60 operates the relays 41–44 via the operation circuit 56 based on the received data. The microcomputer 60 outputs from the change-over signal output terminals 62 signals for changing over output or stop of high frequency transmission signals from the tap output terminals T1–T4. The EEPROM 68 stores the address predetermined for its own tap device 6.

On the other hand, the watchdog timer 66 is a timer for monitoring the operation of the microcomputer 60. It is connected with the clock output terminal 64 and the reset terminal 65 of the microcomputer 60.

Pulse signals for monitoring the operation condition of the microcomputer 60, or the so-called monitoring clocks, are outputted from the clock output terminal 64 to the watchdog timer 66 at intervals of a constant time (usually, several milliseconds). When a monitoring clock is inputted to the watchdog timer 66, it begins counting of time and continues the counting until a next monitoring clock is inputted. The continuing time will be called an "output stop period", hereinafter. The counting is stopped when the next monitoring clock is inputted, and restarted after the counted time is reset to be zero.

A port control command signal outputted from the head-end controller 12 of the center equipment 2 at intervals of a constant time (fixed to be 24 hours, in this embodiment) is contained among command signals inputted from the receiving circuit 52 to the microcomputer 60 via the received data input terminal 61. The port control command signal is a signal for making the microcomputer 60 compulsorily operate the relays, since the relays 41–44 are occasionally changed over to the opposite to originally commanded by the center equipment 2 due to any kind of shock, even while the microcomputer 60 is operating properly.

When a command signal is inputted from the receiving circuit 52 to the microcomputer 60, a built-in timer begins counting of time. The counting of time is continued until a next command signal is inputted. The continuing time will be called an "input stop period", hereinafter. Since the port control command signal is inputted to the microcomputer 60 every 24 hours, the microcomputer 60 does not wait for longer than 24 hours from the input of the first command signal to the input of the next second command signal. That is, at least one command signal is inputted in a day. The command signal can not be inputted to the microcomputer 60 and the microcomputer 60 is put to a waiting state of signal input, even when broadcasting signals are not transmitted to the subscribers television sets connected with the tap output terminals T1–T4 of the tap device 6 due to failure of control of the relays 41–44 using the command signals (commands) from the center equipment 2, because initial setting of any circuit such as an input serial port of an input/output interface and the like is changed, as well as when the command signal is not inputted because of misoperation of the microcomputer 60 due to a thunderbolt and the like. Then, the built-in timer which started counting of time when the command signal was inputted before continues counting of time and the input stop period of the microcomputer 60 exceeds a time longer than an input stop period predetermined for the control circuit 54 (called "predetermined time", hereinafter). Then, the microcomputer 60 compulsorily stops execution of the program and, as a result, stops outputting of the monitoring clock to the watchdog timer 66.

On the other hand, the watchdog timer 66 is put to a waiting state of input of a monitoring clock and the counted time of the timer becomes longer than the output stop period. The counted time will be called "abnormality determining time". The watchdog timer 66 whose output stop period gets to the abnormality determining time outputs a reset pulse signal to the reset terminal 65 of the microcomputer 60. When the microcomputer 60 receives the reset pulse signal from the reset terminal 65, the microcomputer 60 is restarted, thereby returning to its initial state and recovering normal function.

Figure 4A:
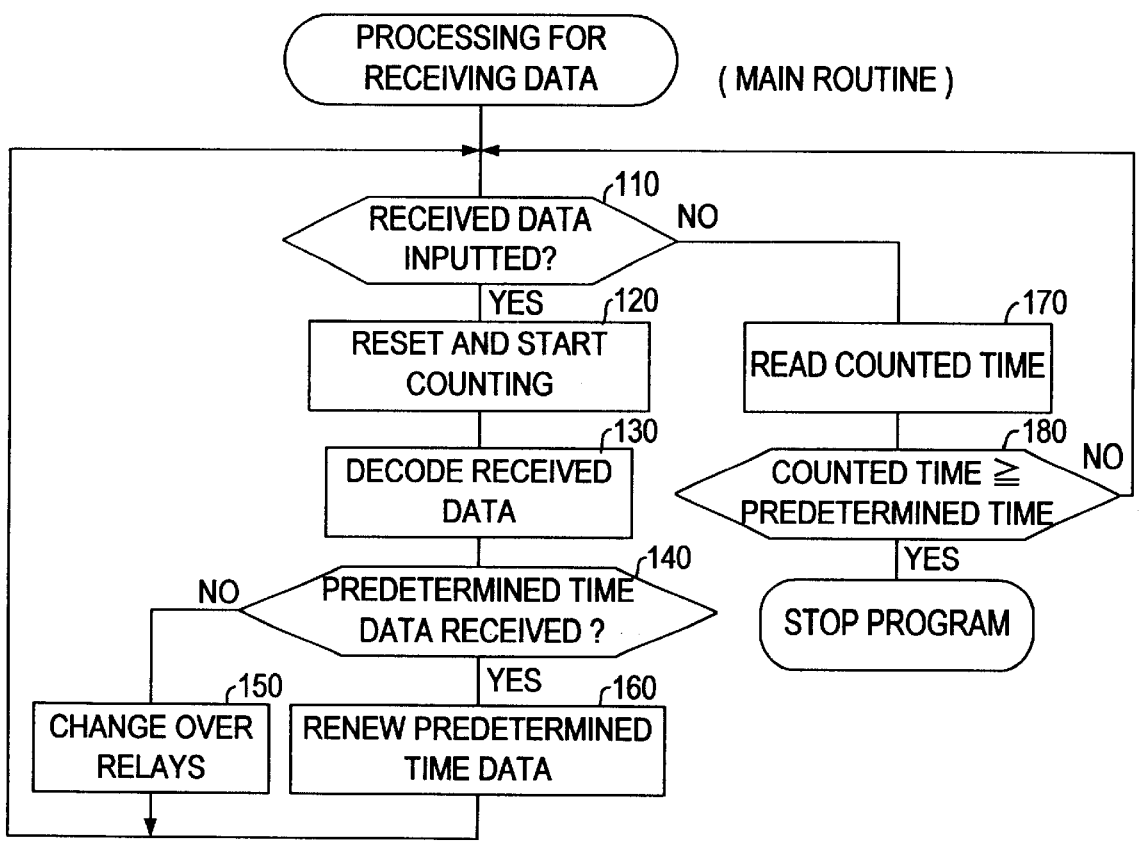
FIG. 4A is a flow chart showing the processing for data receiving executed at a control circuit.
Figure 4B:
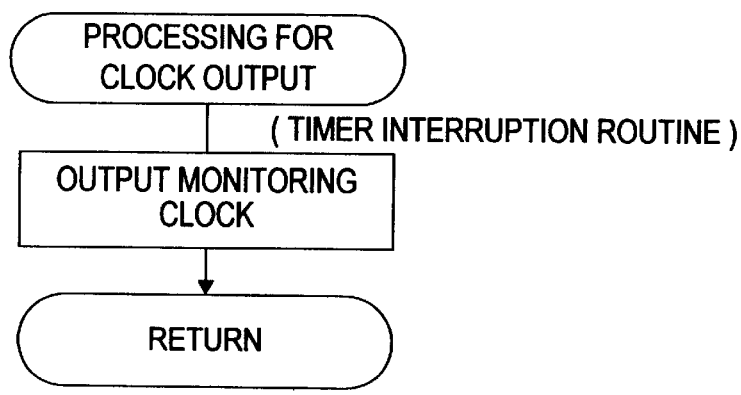
FIG. 4B is a flow chart showing the processing for clock-outputting executed at a control circuit.

FIGS. 4A and 4B show the processing for data receiving executed by the microcomputer 60 to receive the command signal from the center equipment 2 at the control circuit 54.

The processing for data receiving is executed repeatedly at the control circuit 54 when the control circuit 54 becomes operable by being supplied with electricity by the power source circuit 58, after the tap device 6 is equipped on the transmission line 4. FIG. 4A is its main routine and FIG. 4B is its timer interruption routine.

As shown in FIG. 4A, when the processing is started, at first at S110 (S means a step), it is determined whether a received data as a command signal is inputted from the receiving circuit 52. When a received data is inputted, the built-in timer is reset to restart counting of time at the following S120. At the following S130, the content of the received data is decoded according to the following procedure. It is determined whether the command signal received by the receiving circuit 52 is a signal to the tap device 6 itself by comparing the address given to the received data with an address predetermined for the tap device 6. When the addresses coincide with each other, a command for changing over output or stop of high frequency transmission signals from each of the tap output terminals T1–T4, or a change command for changing a data of a predetermined time set for determining to stop the program of the microcomputer 60 is decoded from the command attached to the address.

At subsequent S140, it is determined from the result of decoding whether the predetermined time data is received. When it is received, the predetermined time data stored in the microcomputer 60 is renewed at subsequent S160 and the processing is returned to S110. When the predetermined time data is determined to be not received, at the next S150, the processing for changing over on or off of the signal passes by the relays 41–44 is executed by outputting control signals to the operation circuit 56 according to the result of decoding at S130 and the processing is returned to S110 again.

On the other hand, when it is determined at S110 that the received data is not inputted from the receiving circuit 52, the counted-time at the present of the built-in timer that started counting of time when it previously received the data is read at S170. At continuing S180, it is determined whether the counted time is equal to or longer than the predetermined time. When the counted time is determined to be equal to or longer than the predetermined time, the program of the microcomputer 60 is stopped. When the counted time is shorter than the predetermined time, the processing is returned to S110 again.

FIG.4B is a flow chart showing the clock output processing for periodically outputting monitoring clocks to make the watchdog timer 66 monitor the operation of the microcomputer 60.

The microcomputer 60 outputs the monitoring clocks from the clock output terminal 64 to the watchdog timer 66 by executing the processing for outputting clocks using the timer interruption routine at constant time intervals (several milliseconds). The microcomputer 60 repeats execution of the routine processing until the program is stopped when the counted time of the built-in timer (input stop period) exceeds the predetermined time.

As mentioned above, the tap device 6 is designed to reset the microcomputer 60 by operating the watchdog timer 66, by stopping the program of the microcomputer 60, when the input stop period of the command signal from the receiving circuit 52 gets to a predetermined time longer than a time of periodical outputting of signals from the center equipment 2.

Therefore, according to the embodiment, even when noises are inputted to the control circuit 54 due to, for example, a thunderbolt and, as a result, command signals can not be inputted to the microcomputer 60, the microcomputer 60 can promptly and automatically recover its normal function by being restarted for initial setting.

When a command signal received by the receiving circuit 52 is a change command for changing the predetermined time to the tap device 6 itself, the microcomputer 60 is also designed to change the predetermined time in response to the change command.

Therefore, the microcomputer 60 selects only the command signals to the tap device itself among all command signals received by the receiving circuit 52. When the signal is a change command for changing the predetermined time, the microcomputer 60 can change the predetermined time in response to the change command.

The tap device 6 according to the embodiment can be easily applied to a cable broadcasting system in which the transmission intervals of command signals from the center equipment 2 differ for each of the command signals, thereby a widely usable tap device being provided.

In the tap device 6 of the embodiment, the control circuit 54 composed mainly of the microcomputer 60 is designed to set the condition of on or off of the relays 41–44, by controlling the relays 41–44 in response to command signals from the receiving circuit 52, and the operation circuit 56 is designed to change over the condition of on or off of the signal-passes by supplying the relays 41–44 with electricity under the control of the control circuit 54.

Therefore, in the tap device 6, when a command for changing over the signal passes is outputted by the center equipment 2 as a command signal and the command signal received by the receiving circuit 52 is a command to the tap device 6 itself for changing over the signal passes, the microcomputer 60 can change over the condition of on or off of the signal passes by operating the relays 41–44 via the operation circuit 56 in response to the command.

Consequently, according to the embodiment, when the microcomputer 60 in the tap device 6 can not receive command signals from the center equipment 2 owing to the misoperation due to a thunderbolt and the like, the microcomputer 60 in the tap device 6 is restarted from the initial state to recover automatically the normal function, and sets and changes over the condition of on or off of the signal passes in response to the command signals from the center equipment 2. Then, transmission of broadcasting signals to the subscribers terminals can be quickly restarted and a long break of transmission of broadcasting signals or mistransmission of broadcasting signals can be prevented.

Though one embodiment of the invention was shown above, the invention is not limited to the embodiment but can be variously embodied.

In the above-mentioned embodiment, as shown in the flow chart of FIG. 4A, when a received data is inputted to the microcomputer 60, the input stop period of command signals from the center equipment 2 is counted by resetting the built-in timer to start counting of time. But such operation is not always necessary. For example, after a received data (command signal) is inputted and the data is decoded, it is determined whether the data is for the tap device 6 itself. When the data is determined to be for the device 6 itself, the built-in timer may be reset to start the counting of time.

In this case, the input stop period of command signals to itself is counted in the tap device 6 and the microcomputer 60 is reset when the input stop period exceeds the predetermined time.

Only the specific tap device 6 is reset to be restarted from the initial state by stopping output of command signals only to the corresponding tap device 6 from the center equipment 2, not only when the command signal is not inputted because of misoperation of the microcomputer 60 due to a thunderbolt and the like, but when broadcasting signals are not transmitted to the subscribers television sets connected with the tap output terminals T1–T4 of the tap device 6 due to failure of control of the relays 41–44 using the command signals (commands) from the center equipment 2, because initial setting of any circuit such as a serial port of an input/output interface and the like is changed. Then, the tap device 6 becomes an easily controllable device.

In the above-mentioned embodiment, an example of a tap device 6 which can output broadcasting signals separately from the multiple tap output terminals T1–T4 by providing the splitter 34 is shown. The invention is also applied to a tap device 6 which has no splitter 34 and outputs branched outputs (broadcasting signals) from one tap output terminal.

In the above-mentioned embodiment, by mounting the parts constituting the tap device 6 on three substrates P1, P2 and P3, the third substrate P3 on which devices for branching/outputting broadcasting signals (from the splitter 34 to the tap output terminals T1–T4) are mounted and the second substrate P2 on which devices for control including the directional couplers 30, 36, receiving circuit 52, control circuit 54, operation circuit 56 and power source circuit 58 are mounted can be easily removed from the first substrate P1 of the housing side when those devices have to be exchanged. However, the invention can be applied to a tap device in which all the parts are mounted on one substrate or the parts are mounted on two substrates separately.

In aforementioned embodiment, the electronic device of the invention is applied to the tap device 6. However, it is not always necessary for the device to operate the relays 41–44 for outputting or stopping transmission signals to transmit broadcasting signals to the subscriber's terminal. The electronic device of the invention has only to be provided at least with a receiving circuit 52 for receiving operation commands from the center equipment 2, a control circuit 54 comprising a microcomputer 60 for setting operation mode in response to an operation command and a power source circuit 58 for converting alternate current power signals to direct current voltages.

What is claimed is:

1. An electronic device for a cable broadcasting system for processing transmission signals passing through a transmission line and provided on the transmission line from a center equipment to a terminal device, comprising:

a receiving circuit connected from the transmission line for receiving broadcast signals including command signals, a control circuit including a microcomputer for setting and controlling an operating mode of the electronic device, including distribution of the broadcast signals to recipients according to command signals, the microcomputer including a microcomputer timer counting an input stop period and generating a periodic pulse signal, the periodic pulse signal indicating normal operation of the microcomputer and cessation of the periodic pulse signal indicating a malfunction of the microcomputer, and determining a command signal interval between receiving command signals from the receiving circuit, the microcomputer terminating operation microcomputer when a command signal is not received within the predetermined command signal interval, thereby terminating generating of the periodic pulse signal generated by the microcomputer, and a watchdog timer counting an output stop period and generating a microcomputer reset signal to the microcomputer when a pulse signal is not received within an output stop period abnormality time, wherein the output stop period count is reset to a beginning of the output stop period upon each occurrence of the pulse signal generated by the microcomputer, and the generation of the pulse signal within the input stop period represents normal operation of the input from the receiving circuit to the microcomputer and the generation of the pulse signal within the output stop period abnormality time indicates normal operation of the microcomputer.

2. An electronic device for a cable broadcasting system according to claim 1, wherein the microcomputer extracts only the command signals to the electronic device itself and counts an input stop period of the command signals as an input stop period of the command signals from the receiving circuit, and when the counted input stop period gets to a predetermined time, the microcomputer stops outputting a pulse signal to the watchdog timer.

3. An electronic device for a cable broadcasting system according to claim 1, wherein when a command signal received by the receiving circuit is a change command to the electronic device itself out of all the electronic devices for changing the predetermined time, the microcomputer changes the predetermined time in response to the change command.

4. An electronic device for a cable broadcasting system according to claim 1, wherein the electronic device is a tap device provided with a directional coupler for branching a part of transmission signals passing through the transmission line and outputting the branched transmission signals from a tap output terminal to a terminal device, a change-over device provided in a signal pass transmitting transmission signals branched by the directional coupler to the tap output terminal, for changing over the condition of on or off of the signal pass and an operation circuit for operating the change-over device to change over the condition of on or off of the signal pass, and the microcomputer operates the change-over device via the operation circuit to set the condition of on or off of the signal pass, when a command signal received by the receiving circuit is a command to the tap device for changing over the signal pass.

* * * * *